Apr. 10, 1923. 1,451,361
V. DURAND, JR
METHOD OF MAKING SOLID GLASS RODS HAVING BENDS THEREIN
Filed Nov. 14, 1921
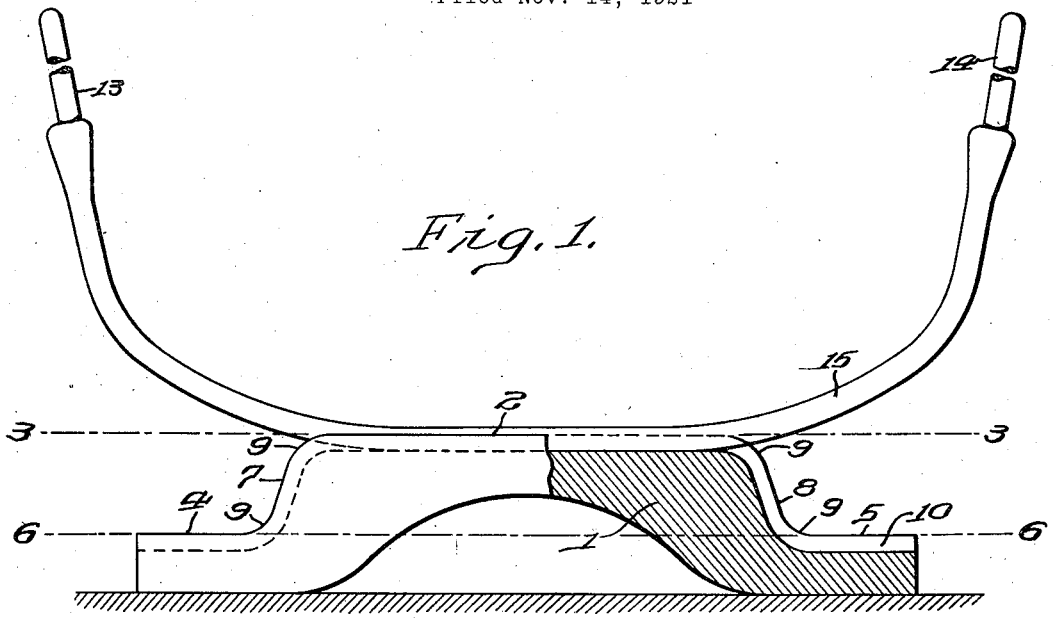
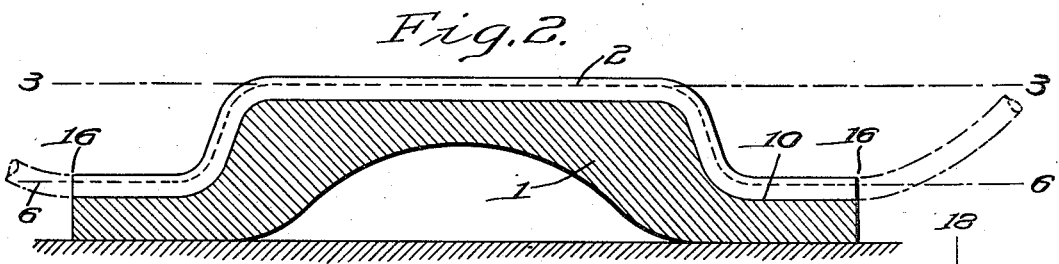
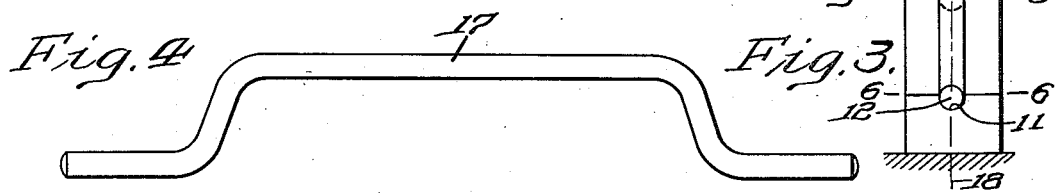 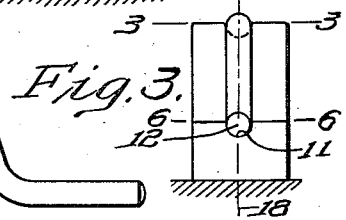
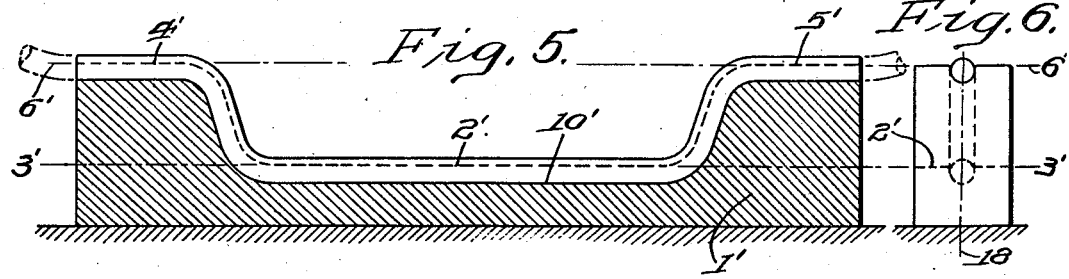 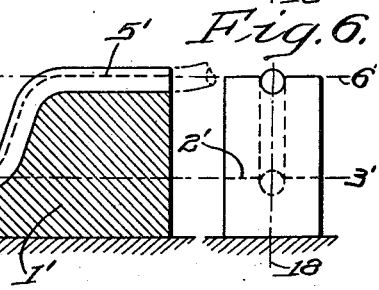
INVENTOR
Victor Durand, Jr.
WITNESS
F. J. Hartman
BY Blount, Moulton & Helbert
ATTORNEYS Patented Apr. 10, 1923.

1,451,361

UNITED STATES PATENT OFFICE.

VICTOR DURAND, JR., OF VINELAND, NEW JERSEY.

METHOD OF MAKING SOLID GLASS RODS HAVING BENDS THEREIN.

Application filed November 14, 1921. Serial No. 514,858.

*To all whom it may concern:*

Be it known that I, VICTOR DURAND, Jr., a citizen of the United States, and a resident of Vineland, in the county of Cumberland and State of New Jersey, have invented certain new and useful Improvements in Methods of Making Solid Glass Rods Having Bends Therein, of which the following is a specification.
My invention relates to processes, by the practice of which solid glass rods having one or more bends therein may be made, and more particularly to those processes for making solid glass rods such as are used for supporting and guiding the filaments or strands of artificial silk in their travel through the tanks or baths in which such filaments are formed.

Heretofore such glass rods have been made by heating straight solid glass rods at one point where a bend is required or desired, bending the rod at such points when it has been heated sufficiently to permit of such manipulation, then permitting the softened portion of the rod to cool, solidify, or set, then heating the rod at another point where such a bend is desired, then bending it in the same way, and so on until the solid glass rod has been given any desired number of bends, as for example, the four bends required in such glass rods as are used in the manufacture of artificial silk.

This whole process above described is expensive, not only on account of the fact that a great deal of time is required to form the bends therein, but because such heavy solid-glass rods are frequently broken during the process of bending the same on account of improper heating or careless handling.
Moreover, in bending such a rod by the process above outlined, it is difficult to bend the rods uniformly or in such a manner as to keep the center line or axis of the rod all in a single plane as is desired on rods of this character.

The objects of my invention are to avoid the objections above noted; to provide a process whereby substantially solid-glass rods, uniform as to the location of the bends therein and in which the axis of the rods is always in alinement or in a single plane; and to substantially reduce the cost of the manufacture thereof.

A further object of my invention is to produce solid-glass rods having uniform bends therein, substantially simultaneously with the production or formation of the rod itself.

Referring to the drawings forming a part of this specification and in which the same reference characters are used throughout the various views to designate the same parts, Fig. 1 is a side elevational view of a former used in connection with my process, and showing the solid-glass rod in the process of being formed;

Fig. 2 shows the same former with the completed rod lying therein;

Fig. 3 is an end view of the former shown in Figs. 1 and 2;

Fig. 4 is a view of the solid-glass rod having bends therein, produced by the practice of my improved process;

Fig. 5 illustrates a modification of my process in which a slightly different former is used than that shown in Fig. 1; and Fig. 6 is an end view of the modification shown in Fig. 5.

In carrying out my process, I first make a former 1 of iron or some other suitable metal. Such former is provided with a central or a middle surface 2 lying in one plane 3, preferably horizontal, two end surfaces 4 and 5 lying in a second plane 6 parallel to the first-mentioned plane 3, and intermediate surfaces 7, 8, connecting said central and end surfaces by relatively slightly curving surfaces or edges 9, 9, 9, 9. On the face of said former 1 and in the surfaces above described, I provide a groove 10 of even depth and having a semi-circular bottom 11, the center of curvature 12 of which is preferably a little below the face surfaces forming the face of said former 1. The width of said groove is made substantially equal to that of the diameter of the rod to be formed.

This former 1 is heated to substantially the temperature of plastic glass.

A lump or batch of plastic glass is then stuck or caused to adhere to the ends of two hot iron rods 13 and 14, and while the glass is hot and plastic, the lump or batch is carefully pulled or stretched while being constantly turned until a considerable length or stretch 15 is obtained. The stretch so formed will be round or circular in cross-section and of substantially constant diameter, the diameter being that of the width of the groove 10 in the former 1. When such a stretch of plastic glass, circular in cross-section, has been produced, the stretch so formed is laid onto the former 1 and in the groove 10, whereupon the said stretch of glass will lie in said groove and partake of the longitudinal shape thereof. It is not intended that this groove 10 shall give any particular shape or size or diameter to the plastic rod of glass so placed therein, so far as its cross-sectional shape is concerned. The stretch of glass formed by the glass maker on his tools 13, 14 will determine the size and diameter of the glass rod to be produced but the groove 10 in the former 1 tends to hold the glass in the shape in cross-section which has been imparted to it by the glass maker and will serve merely to put the bend in it as shown in Fig. 2. When this soft plastic glass rod has been thus laid in the groove 10 of the former 1, as shown in Fig. 2, the soft glass will be severed at the points 16, 16 at the ends of the former 1 and then the ends may be rounded over as shown in Fig. 4, in any suitable manner. The mold is not heated sufficiently to melt the glass placed therein. When being used it should be of about the temperature of the glass which is placed therein. After the ends of the plastic glass rod have been severed, as has been above referred to, the mold is allowed to cool, and in cooling, the glass solidifies and retains the shape into which it has been bent while in the plastic condition. The finished glass rod 17 is shown in Fig. 4. The axis of the middle portion thereof will lie in one plane; the axis of the ends thereof will lie in a second plane parallel to the first-mentioned plane, and the axis of the rod throughout its entire length will lie in a third plane 18 which is normal to the two parallel planes above referred to.

In Figs. 5 and 6, a modified form of my invention is disclosed, in which the former 1' is provided with an intermediate or central surface 2' lying in the plane 3' and below the surfaces 4' and 5' at the ends, which lie in the plane 6' parallel to the plane 3'. The groove 10' therein extends longitudinally of the former 1', and the axis of curvature thereof lies in a plane 18 normal to the planes 3' and 6'.

In both these forms of my invention, the axis of the glass rod will lie in a vertical plane 18 extending at right angles to the planes 3 and 6, and 3' and 6', because the center of the curvature of the groove 10 will be made in that plane 18. From the above it will be seen that by practising the process above described, I am able to produce a glass rod having the bends therein desired at the same time that the glass is formed, or while the glass rod is being formed by the glass maker. The ends so put into the glass while the rod is being formed and is in a plastic condition, thereby saves the time required to re-heat portions of the glass at the points where the bends are desired and avoids the danger of breaking the glass on account of improper heating. Moreover, a plurality of rods may be made, substantially identical, by the practise of the process forming my invention and the bends will be accurately made without any particular care or attention required to so make them. The workman is merely required to make a length or stretch of solid glass rod of the uniform and desired diameter and length, and then, while the glass is plastic, places it in the groove of the form, cut off the glass rods at the end of the form, and allow the rod so formed to solidify.

It will thus be seen that I have provided a process whereby the bends to be placed in a solid-glass rod are formed therein practically at the same time that the rod is made and while the rod is soft and plastic, or ductile. It will also be seen that the rods made in accordance with the process above described will be substantially uniform with respect to the bends therein, one rod being like any other rod made by the process and at the same time the axis of the entire length of the rod may be readily maintained in a single plane without imposing upon the workman any special care or requiring any special skill to so aline the bent portions of the rod so formed.

Having thus described my invention, what I claim and desire to protect by Letters Patent of the United States is:

1. The process or method of making solid-glass rods with right angle bends therein which consists in drawing a mass of plastic glass into a stretch of plastic glass, circular in cross-section, and substantially uniform in diameter, laying said stretch while plastic into a groove substantially semi-circular in cross-section, the center line of the middle portion of said groove lying in one plane, the center line of the two ends of said groove lying in a second plane parallel to said first-mentioned plane and the center line of the entire groove also lying in a plane normal to said parallel planes.

2. The process or method of making solid-glass rods with right angle bends therein which consists in manually drawing a mass of plastic glass down to a stretch of solid plastic glass, circular in cross-section and substantially uniform in diameter, laying said stretch while plastic into a groove in a hot former, said groove being substantially semi-circular in cross-section, the central or middle part of said groove lying in one plane, the two ends of said groove lying in a second plane parallel to said first-mentioned plane, and the entire groove also lying in a plane normal to said parallel planes, severing said stretch of solid plastic glass at the ends of said former, and allowing said former and the glass in the groove thereof to slowly cool.

In witness whereof, I have hereunto set my hand this 12th day of November, 1921.

VICTOR DURAND, Jr.